(12) United States Patent
Kim et al.

(10) Patent No.: US 11,971,920 B1
(45) Date of Patent: Apr. 30, 2024

(54) METHOD FOR DETERMINING CONTENT ASSOCIATED WITH VOICE SIGNAL

(71) Applicant: ActionPower Corp., Seoul (KR)

(72) Inventors: Hyungwoo Kim, Gimpo-si (KR); Seungho Kwak, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 18/359,741

(22) Filed: Jul. 26, 2023

(30) Foreign Application Priority Data

Oct. 13, 2022 (KR) ........................ 10-2022-0131393

(51) Int. Cl.
G06F 16/9535 (2019.01)
G06F 16/432 (2019.01)
G06F 40/216 (2020.01)
G06F 40/279 (2020.01)

(52) U.S. Cl.
CPC ........ G06F 16/433 (2019.01); G06F 16/9535 (2019.01); G06F 40/216 (2020.01); G06F 40/279 (2020.01)

(58) Field of Classification Search
CPC ............... G06F 16/433; G06F 16/9535; G06F 16/9536; G06F 16/9538; G06F 16/951; G06F 16/953; G06F 16/9532
See application file for complete search history.

(56) References Cited

U.S. PATENT DOCUMENTS

| 9,679,570 | B1 | 6/2017 | Edara |
| 10,410,622 | B2* | 9/2019 | Anantaram ............ G10L 15/01 |
| 2015/0242386 | A1* | 8/2015 | Moreno Mengibar ...................... G06F 40/232 704/235 |
| 2018/0096678 | A1* | 4/2018 | Zhou ....................... G10L 15/08 |
| 2020/0357412 | A1* | 11/2020 | Robert Jose ........ G10L 15/1815 |
| 2021/0327410 | A1* | 10/2021 | Beaufays ............. G10L 15/22 |

FOREIGN PATENT DOCUMENTS

| KR | 20200069500 A | 6/2020 |
| KR | 20210046275 A | 4/2021 |
| KR | 102279505 B1 | 7/2021 |
| KR | 102334396 B1 | 12/2021 |
| KR | 102355903 B1 | 1/2022 |
| KR | 20220051592 A | 4/2022 |
| KR | 102431754 B1 | 8/2022 |
| KR | 20220135901 A | 10/2022 |

* cited by examiner

*Primary Examiner* — Kris E Mackes
(74) *Attorney, Agent, or Firm* — Seed IP Law Group

(57) ABSTRACT

Disclosed is a method for determining a content associated with a voice signal, which is performed by a computing device. The method may include converting a voice signal and generating text information. The method may include determining a plurality of target word candidates. The method may include determining a target word among the plurality of target word candidates based on a comparison between the plurality of target word candidates and the generated text information. The method may also include determining a content associated with the target word.

12 Claims, 5 Drawing Sheets

← Recording.m4a

B I U S Tx ☒ □

Participant 1 00:00

Hi, I'm Cody. I'm Cody, and today I'm going to show you how to convert your recorded voice files into text. Please access Goal.com in your Chrome browser. You'll also need to sign in with your Google ID. If you look in the top right corner, there's a checkerboard icon, and if you click on it, you'll see "More Google services." If you click on "More see," you'll see Documents, and then you choose a document 'you should be in Documents', and you'll see "Documents." There is a menu 'talk' on the top menu and a menu 'voice input' in the tool menu. When the voice input is launched, one new window of a microphone icon is created. Then, a language can be chosen, and simply choose the language used in the recording file.

Participant 2 00:22

To start recording your voice, simply click on the microphone icon. When you speak while the microphone is active, it will be automatically transcribed into text like this. This feature is used to transcribe the recorded voice files. Let's go ahead and run a YouTube video on my smartphone. Hello. Thank you, and you can see that the sound coming in through the computer's microphone is automatically converted into text. There is also a method for using Google document or there is also a method for using a Chrome extension program. When you inputs Chrome Extension in the address bar of your Chrome browser, the extension program will appear.

Participant 1 00:33

Hi, I'm Cody.

Participant 1 00:33

Simply click on the microphone icon.

Participant 2 00:44

To start recording your voice, simply click on the microphone icon. When you speak while the microphone is active, it will be automatically converted into text like this. This feature is used to convert the recorded voice 1x Auto save upon edition ⓘ Information | 🗐 Summary | Q Search ⊕ Face-to-face (offline)-IT ⊕ Korean Keyword 10

[Keyword] [Keyword comma] [All To text] [Dictation]
[All voices] [App support] [Call] [Automatic conversion]
[Super-app] [Editor]

Connected history

📞 Call recording 01084976998_220613_152329.m4a
2020/4/21 22:00

📄 Brocure_Sample_220606.pdf
2020/4/21 19:43

🔗 https://www.testerapp.com
2020/4/21 19:43

⬆ Directly upload to cloud  ⬆ Directly upload  ⟲ Correct history

*Fig. 4*

METHOD FOR DETERMINING CONTENT ASSOCIATED WITH VOICE SIGNAL

CROSS-REFERENCE TO RELATED APPLICATIONS

This application claims priority to and the benefit of Korean Patent Application No. 10-2022-0131393 filed in the Korean Intellectual Property Office on Oct. 13, 2022, the entire contents of which are incorporated herein by reference.

BACKGROUND

Technical Field

The present disclosure relates to a method for determining a content, and more particularly, to a technology of determining a related content by considering a voice recognition result text, and recommending the determined content.

Description of the Related Art

Speech-to-Text (STT) is a technology that converts a voice signal into a text. In other words, the STT is a technology of analyzing a voice signal (or voice signals), and then outputting a text corresponding to the voice signal.

A result text output by the STT cannot be perfect in nature. For example, the STT result text may include typos and inscriptions.

Korean Patent Unexamined Publication No. 10-2022-0051592 (Apr. 26, 2022) discloses System for Recommending Online Lectures, And Operating Method Thereof.

BRIEF SUMMARY

The inventors have realized that when the related content is determined by considering the STT result text, accuracy is low and technical implementation is difficult. For example, there is often a problem in that it is difficult to determine whether the key word or the target word is included due to incompleteness of the STT result text.

Various embodiments of the present disclosure addresses one or more technical problems in the related art including the problems identified above. Various embodiments provide a method for determining a target word which is a keyword in incompleteness of a speech-to-text (STT) result text, and recommending an associated content based thereon. Various embodiments also provide a computer program and a computing device incorporating the aforementioned method.

The technical benefits to be achieved by the present disclosure is not limited to the above-mentioned technical benefits, and may include various technical benefits within the scope apparent to those skilled in the art from the contents to be described below.

An exemplary embodiment of the present disclosure provides a method performed by a computing device according to an exemplary embodiment of the present disclosure in order to implement the above-described object. The method may include: converting a voice signal and generating text information; determining a plurality of target word candidates; determining a target word among the plurality of target word candidates based on a comparison between the plurality of target word candidates and the generated text information; and determining a content associated with the target word.

In an exemplary embodiment, the determining of the target word among the plurality of target word candidates may include at least one of based on user information associated with the voice signal, determining the plurality of target word candidates, or based on keyword information extracted from the generated text information, determining the plurality of target word candidates.

In an exemplary embodiment, the determining of the plurality of target word candidates based on the user information associated with the voice signal may include determining the plurality of target word candidates based on type information of an STT model used by the user.

In an exemplary embodiment, based on the keyword information extracted from the generated text information, the determining of the plurality of target word candidates may include analyzing frequencies of words in the generated text information, and determining a plurality of keywords, and determining the plurality of target word candidates based on the plurality of keywords.

In an exemplary embodiment, the analyzing of the frequencies of the words in the generated text information, and extracting of the plurality of keywords may include separating the generated text information into a plurality of text parts based on topic information, and analyzing a frequency in each of the plurality of separated text parts, and extracting a plurality of keywords.

In an exemplary embodiment, the method may further include when a word for a content source or a word for a content-related time is included in the text information, directly determining, as the target word, the word for the content source or the word for the content-related time regardless of whether the word being included in the plurality of target word candidates.

In an exemplary embodiment, the determining of the target word among the plurality of target word candidates may include calculating a similarity with the text information for each of the plurality of target word candidates, and determining the target word among the target word candidates based on the similarity calculation result.

In an exemplary embodiment, the calculating of the similarity with the text information for each of the plurality of target word candidates may include calculating edit distances from all words of the text information with respect to each of the plurality of target word candidates, and calculating a similarity to each target word candidate based on the edit distance calculated for each target word candidate.

In an exemplary embodiment, the calculating of the similarity to each target word candidate based on the edit distance calculated for each target word candidate may include comparing an edit distance calculated for each target word candidate with a threshold value, and assigning a weight to the similarity when the calculated edit distance is less than the threshold value.

In an exemplary embodiment, the calculating of the similarity with the text information for each of the plurality of target word candidates may include assigning a highest similarity without performing a direct calculation for the word for the content source or the word for the content-related time when the plurality of target word candidates include the word for the content source or the word for the content-related time.

In an exemplary embodiment, the determining of the content associated with the target word may include determining a plurality of content candidates, and determining the content associated with the target word among the plurality of content candidates.

In an exemplary embodiment, the determining of the plurality of target word candidates may include determining the plurality of content candidates based on the word for the content source or the word for the content-related time when a target word set includes the word for the content source or the word for the content-related time, and the determining of the content associated with the target word among the plurality of content candidates may include determining a content associated with another target word of the target word set among the plurality of content candidates.

In an exemplary embodiment, the determining of the plurality of content candidates may include when the target word set does not include the word for the content source or the word for the content-related time, determining the plurality of content candidates based on a content related to a user account or a user device, and determining a content associated with target word among the plurality of content candidates may include determining a content associated with at least one target word of the target word set among the plurality of content candidates.

Another exemplary embodiment of the present disclosure provides a computer program stored in a non-transitory computer-readable storage medium having therein according to an exemplary embodiment of the present disclosure in order to implement the above-described object. When the computer program is executed by one or more processors, the computer program allows the following operations for determining a content associated with a voice signal to be performed, and the operations may include: converting a voice signal and generating text information; determining a plurality of target word candidates; determining a target word among the plurality of target word candidates based on a comparison between the plurality of target word candidates and the generated text information; and determining a content associated with the target word.

Still another exemplary embodiment of the present disclosure provides a computing device in order to implement the above-described object. The device may include: at least one processor; and a memory, and the at least one processor may be configured to convert a voice signal and generate text information, determine a plurality of target word candidates, determine a target word among the plurality of target word candidates based on a comparison between the plurality of target word candidates and the generated text information, and determine a content associated with the target word.

According to an exemplary embodiment of the present disclosure, a technology of accurately determining and recommending a content associated with a voice signal can be provided. For example, according to the exemplary embodiment of the present disclosure, even if an incompleteness STT result text is output based on the voice signal, it is possible to determine and recommend an accurate associated content matching the voice signal or the output text.

On the other hand, the effects of the present disclosure are not limited to the effects mentioned above, and various effects may be included within a range apparent to those skilled in the art from the contents to be described below.

BRIEF DESCRIPTION OF THE SEVERAL VIEWS OF THE DRAWINGS

FIG. 4 is a schematic view of a user interface related to an operation of determining the content associated with the voice signal according to an exemplary embodiment of the present disclosure.

DETAILED DESCRIPTION

Figure 1:
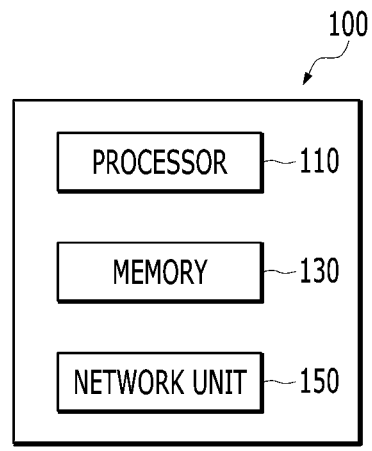
FIG. 1 is a block diagram of a computing device for determining a content associated with a voice signal according to an exemplary embodiment of the present disclosure.

Hereinafter, various embodiments are described with reference to the drawings. In the present specification, various descriptions are presented for understanding the present disclosure. However, it is obvious that the embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable medium having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or," not exclusive "or." That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function, an artificial neural network, and a neural network may be interchangeably used.

FIG. 1 is a block diagram of a computing device for determining a content associated with a voice signal according to an exemplary embodiment of the present disclosure.

A configuration of the computing device 100 illustrated in FIG. 1 is only an example simplified and illustrated. In an exemplary embodiment of the present disclosure, the computing device 100 may include other components for performing a computing environment of the computing device 100, and only some of the disclosed components may constitute the computing device 100.

The computing device 100 may include a processor 110, a memory 130, and a network unit 150.

The processor 110 may be constituted by one or more cores, and include processors for data analysis and deep learning, such as a central processing unit (CPU), a general purpose graphics processing unit (GPGPU), a tensor processing unit (TPU), etc., of the computing device. The processor 110 may read a computer program stored in the memory 130 and process data for machine learning according to an exemplary embodiment of the present disclosure. According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, the GPGPU, and the TPU of the processor 110 may process learning of the network function. For example, the CPU and the GPGPU may process the learning of the network function and data classification using the network function jointly. In addition, in an exemplary embodiment of the present disclosure, the learning of the network function and the data classification using the network function may be processed by using processors of a plurality of computing devices together. In addition, the computer program performed by the computing device according to an exemplary embodiment of the present disclosure may be a CPU, GPGPU, or TPU executable program.

According to an exemplary embodiment of the present disclosure, the processor 110 may recommend an associated content from user information associated with the voice signal or the STT result text. For example, the processor 110 ① performs STT on the input audio (voice signal) (e.g., in the case of a video file, performs the STT on the audio file after audio-image separation), and ② determines target word candidates by performing topic segmentation and keyword extraction for the STT result text, or determines target word candidates for the corresponding audio based on user account information (e.g., job group, user dictionary, etc.), ③ compares the determined target word candidates with the STT result text, and when a word in which an edit distance is less than a threshold value is detected, determines the corresponding target word candidate as the target word (=key word), and ④ proposes a contents associated with the target word to recommend a content related to an STT result.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The techniques described herein may be used not only in the networks mentioned above, but also in other networks.

Figure 2:
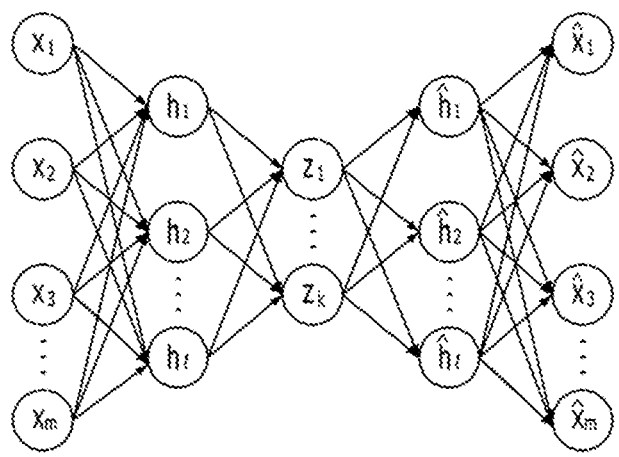
FIG. 2 is a schematic view illustrating a network function according to an exemplary embodiment of the present disclosure.

FIG. 2 is a schematic diagram illustrating a network function according to the embodiment of the present disclosure.

Throughout the present specification, the meanings of a calculation model, a nerve network, the network function, and the neural network may be interchangeably used. The neural network may be formed of a set of interconnected calculation units which are generally referred to as "nodes." The "nodes" may also be called "neurons." The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of reducing or minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

According to an exemplary embodiment of the present disclosure, the computing device 100 may include an input module 111, an STT module 112, a target word candidate determination module 113, a target word determination module 114, a content determination module 115, and a display module 116. Meanwhile, a plurality of modules that may be included in the computing device 100 may be controlled by the processor 110 or implemented by an operation of the processor 110. In addition, the modules that may be included in the computing device 100 in relation to the operation of determining the content associated with the voice signal are not limited to the plurality of modules described above, and additional modules may be included. A plurality of exemplary modules for determining the content associated with the voice signal are described in more detail below.

Figure 3:
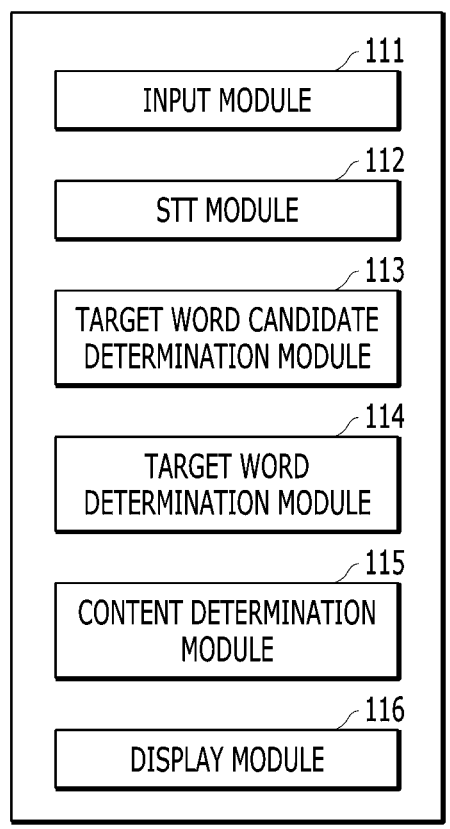
FIG. 3 is a block diagram of a plurality of modules of determining a content associated with a voice signal according to an exemplary embodiment of the present disclosure.

FIG. 3 is a block diagram of a plurality of modules of determining a content associated with a voice signal according to an exemplary embodiment of the present disclosure.

According to an exemplary embodiment of the present disclosure, the input module 111 may receive an audio signal or a spectrogram obtained by converting the audio signal. For example, the input signal or spectrogram may be extracted from a video (e.g., YouTube video). In addition, when the input file is a video file, the input module 111 may perform audio-image separation to extract only the audio signal or the spectrogram obtained by converting the audio signal.

According to an exemplary embodiment of the present disclosure, the STT module 112 may perform the STT on the input audio signal and output the STT result text, and may be configured by a neural network model based on deep learning. In addition, the STT module 112 may generate text information by converting a voice signal input from the input module 111. Speech To Text, or Automatic Speech Recognition (STT or ASR) performed by the STT module 112 is a dictation technology that converts voice into text. An input of the STT may include at least any one of the voice signal, a spectrogram obtained by converting the voice signal, or a voice feature. In addition, an output of the STT is a text in the form of a character string. Meanwhile, the STT model may be implemented in various types of models including the neural network model described above. In addition, the STT model may be divided into a modularized scheme and a non-modularized end-to-end (e2e) scheme according to an implemented scheme. Here, the modularized scheme may include an acoustic model (a model that indicates how the voice signal may be expressed), a language model (a model that assigns a probability of occurrence to a word based on a given sentence and word), and a traditional scheme of model (e.g., some models of Kaldi toolkit based ASRs, a Hybrid-ASR model, etc.) performing the STT by dividing into a pronunciation dictionary, etc., but is not limited thereto. On the other hand, the non-modularized scheme mainly means an e2e model (e.g., a transformer-based encoder decoder model, etc.), and the model may be created by learning a lot of data without a sub-module. Meanwhile, a beam search technique is representative of the decoding technique, and the beam search technique is a method that does not predict just one word that is closest to a correct answer according to the situation, but opens up various possibilities and considers the entire sentence to find the most optimal correct answer.

According to an exemplary embodiment of the present disclosure, the target word candidate determination module 113 may determine a plurality of target word candidates. For example, the target word candidate determination module 113 may determine the plurality of target word candidates based on user information, or determine the plurality of target word candidates based on key word information extracted from text information generated by converting the voice signal.

According to an exemplary embodiment, the target word candidate determination module 113 may determine the plurality of target word candidates based on user information associated with the voice signal. The user information may include job information, information on a specialized domain of a previously used STT model, and user dictionary information that collects frequently used words designated in advance by a corresponding account user. As an example, a keyword predetermined according to the job information may be determined as the target word candidate. When the user's job is "developer," the target word candidate determination module 113 may determine a predetermined keyword frequently used in a developer job group as the target word candidate. As another example, the target word candidate determination module 113 may determine the plurality of target word candidates based on information on the type of STT model used by the user. In other words, the keyword according to the specialized domain of the STT model previously used by the user may be determined as the target word candidate. The target word candidate determination module 113 may determine a keyword used in a legal field as the target word candidate when the STT model previously used is a "law" field-specialized model. As still another example, the target word candidate determination module 113 may determine, as the target word candidate, frequently used words (e.g., a proper noun in a corresponding field) included in user dictionary information and designated in advance by the user. However, the target word candidates determined based on the user information described above are only an example and are not limited thereto, and various examples may exist.

The target word candidate determination module 113 extracts a keyword from the STT result output from the STT module 112 to determine the plurality of target word candidates. In other words, the target word candidate determination module 113 may determine plurality of target word candidates based on key word information extracted from text information generated through the STT. (1) As an example, the target word candidate determination module 113 may extract a plurality of key words from the generated text information based on a predetermined keyword dictionary for each field, and determine the plurality of target word candidates based on the plurality of extracted keywords. (2) In addition, the target word candidate determination module 113 may determine a plurality of keywords by analyzing frequencies of words in the generated text information. In an exemplary embodiment, the target word candidate determination module 113 may identify words whose appearance frequency is equal to or greater than a preset threshold value by using a term frequency-inverse document frequency (TF-IDF) algorithm, and extract the identified words as the plurality of keywords. (3) Additionally, the target word candidate determination module 113 may separate the generated text information into a plurality of text parts (e.g., a plurality of paragraphs) based on topic information, and extract the plurality of keywords by analyzing a frequency in each of the plurality of separated text parts. That is, the target word candidate determination module 113 may perform topic segmentation based on the topic information prior to determining key words through frequency analysis.

Here, the topic segmentation is a task of dividing a long text into appropriate topic paragraphs. The topic segmentation may increase the efficiency of processing of an AI model. In an exemplary embodiment, the target word candidate determination module 113 may generate the plurality of text parts (e.g., text parts generated by segmenting the STT result based on the topic information) through a process of segmenting the generated text and extracting summary information for each of the segmented parts, and grouping segments having similar summary information. In addition, the target word candidate determination module 113 may generate the plurality of text parts through a process of analyzing similarities between sentences included in the generated text and grouping sentences that are similar to each other. Meanwhile, similarity comparison between the sentences may be performed using a language model such as Bidirectional Encoder Representations from Transformers (BERT). The target word candidate determination module 113 described above does not directly determine the "target word" from the text information generated by the STT, but determines a final target word within the target word candidates after the "target candidate word" is determined in advance to determine the target word with relatively higher accuracy (as compared with the case where the target word is determined directly from the STT result). Therefore, the conventional problems of difficulty in direct extraction of target words due to incompleteness STT result can be solved.

According to an exemplary embodiment of the present disclosure, the target word determination module 114 may basically determine the target word based on the plurality of target word candidates generated by the target word candidate determination module 113. (The exemplary embodiments will be discussed in more detail below).

However, in a specific situation, the target word determination module 114 may directly determine the target word without considering the plurality of target word candidates. For example, if a word for a content source or a word for a content-related time is included in the text information, the target word determination module 114 may directly determine the word for the content source or the word for the content-related time as the target word regardless of whether the corresponding word being included in the plurality of target word candidates. For example, the target word determination module 114 may directly determine "yesterday" and "news" as the target words when a text corresponding to "in yesterday news, the weather-" is included in the text information. On the other hand, if the text information includes the text corresponding to "in yesterday news, the weather-," since "weather" is not information about the content source or content-related time, the target word determination module 114 may not directly determine "weather" as the "target word."

Hereinafter, examples in which the target word determination module 114 determines the target word based on the plurality of target word candidates will be described.

According to an exemplary embodiment of the present disclosure, the target word determination module 114 may determine the target word among the plurality of target word candidates based on a comparison between the "the plurality of target word candidates" and the "text information generated by the STT. Here, the target word may be a word that is highly likely to be a keyword associated with the input audio content. In addition, the number of target words may be one or plural. For example, the target word determination module 114 may calculate a similarity with the text information for each of the plurality of target word candidates. In other words, the target word determination module 114 may calculate a similarity with the text information that is a result of performing the STT for each of the plurality of target word candidates determined by the target word candidate determination module 113, and based on this, determine the target word among the target word candidates. More specifically, the target word determination module 114 may calculate an edit distance with all words of the text information for each of the plurality of target word candidates. As an example, the target word determination module 114 may determine, as the target word, a word of which edit distance from the target word candidates is equal to or smaller than a threshold value among the words included in the text information generated by the STT by using a Multi-PEX algorithm with respect to two or more target word candidates. In addition, the target word determination module 114 may calculate a similarity of each target word candidate based on the edit distance calculated for each target word candidate. In addition, the target word determination module 114 may compare the edited distance calculated for each target word candidate with the threshold value. In addition, the target word determination module 114 may assign a weight to the similarity when the calculated edit distance is less than the threshold value. For example, when the plurality of target word candidates include a first target word candidate, a second target word candidate, and a third target word candidate, the target word determination module 114 may calculate the edit distance from all words of the text information for each of the first target word candidate, the second target word candidate, and the third target word candidate. In addition, the target word determination module 114 compares the edit distances calculated for the first target word candidate, the second target word candidate, and the third target word candidate with a threshold value, and as an example, when the calculated edit distance of the first target word candidate is less than the threshold value, the target word determination module 114 may assign the weight to the similarity of the first target word candidate.

On the other hand, when the plurality of target word candidates include the word for the content source or the word for the content-related time, the target word determination module 114 may assign a highest similarity to the word for the content source or the word for the content-related time without performing a direct calculation. (For reference, the word for the content source or the word for the content-related time, as described above, even if the corresponding word is not included in the plurality of target word candidates by the target word candidate determination module 113, the corresponding word may be directly determined as the target word. However, in other cases, it may be determined that the word for the content source or the word for the content-related time is included in the plurality of target word candidates, and in this case, the target word determination module 114 directly assigns the highest similarity without the direct calculation to allow the corresponding word to be selected as the target word even by such a route.). For example, if the text corresponding to "in yesterday news, the weather ~" is included in the text information, the target word determination module 114 may assign the highest similarity to "yesterday" and "news" which is the word for the content source or the word for the content-related time without the direct calculation.

The target word determination module 114 may determine the target word among the target word candidates based on the similarity calculation result. For example, the target word determination module 114 may determine the target word among target word candidates that satisfy a preset reference (e.g., top 10%) based on the similarity calculation result. As another example, the target word determination module 114 may determine the target word from among the target word candidates according to a predetermined reference (e.g., top 10% of all target word candidates) based on the calculated edit distance. In addition, the target word determination module 114 may assign a higher similarity to a target word candidate having a shorter editing distance.

On the other hand, the edit distance mentioned above may be determined in various schemes. For example, the edit distance may be defined as the minimum number of edits required when converting one of the two character strings to another character string when there are two character strings. In addition, here, the type of edition may include character deletion, insertion, and substitution. In addition, the edit distance may be calculated based on pronunciation or based on text. For example, the editing distance may be calculated based on converting the text into a pronunciation symbol or based on the text itself (e.g., calculated in units of graphemes). Meanwhile, the edit distance algorithm may include Levenshtein distance, Longest common subsequence, Hamming distance, and the like, and may include various algorithms other than the algorithms.

With respect to STT result text information (T) and search target word set (=target word candidate set) $Q=\{q_1, q_2, q_n\}$ (in this case, both T and $q_i$ are character strings having a length of 1 or more), when a character string section is searched in which an edit distance from any element of the target word candidate Q in the text information T is equal to or less than a threshold value, if a naive edit distance algorithm or a simple edit distance calculation algorithm is used, there is a problem in that a runtime increases exponentially. To solve this problem, the target word determination module 114 according to an exemplary embodiment of the present disclosure may use approximate information for a plurality of character strings included in the target word candidate set Q or the text information T, and perform a search by using approximated information. For example, the processor 110 according to an exemplary embodiment of the present disclosure may determine a word of which edit distance from the target word candidate Q among the words included in the text information T is equal to or less than a threshold value as the target word by using a multi-string approximate (fuzzy) matching algorithm.

Exemplarily, when there is one target word candidate q to be searched (e.g., when the size of the target word candidate set Q is 1), the target word determination module 114 may determine a word of which edit distance from the target word candidate q among the words included in the text information T is equal to or less than a threshold value by using a PEX algorithm. In addition, the target word determination module 114 may determine a section in which an editing distance from the target word candidate (q, the only element of Q) in the text information T is less than or equal to a threshold value k, and identify words based on the determined section. In this case, the target word determination module 114 may determine a section in which the edit distance from the target word candidate q in the text information T is equal to or less than the threshold value k based on a premise that "when a correct answer section exists in the text information T (that is, a section where the edit distance from the target word candidate is equal to or less than the threshold value k), if the target word candidate q is segmented into k+1 elements, at least one among k+1 elements exists in the correct answer section." For example, the target word determination module 114 may divide the target word candidate q into k+1 elements, and then search the k+1 elements in the text information T by using a multi-string exact matching algorithm (e.g., Aho-corasick, etc.), and when at least one element of the k+1 elements is searched in the text information T, the target word determination module 114 may identify the word of which edit distance is equal to or less than the threshold value k in a section (e.g., a section which is long as a length of the target word candidate q at both sides of the searched element) around the searched element. In addition, the target word determination module 114 may determine that, when all of the k+1 elements are not searched in the text information T, "there is no word of which edit distance from the target word candidate q is equal to or less than the threshold value k within the text information T."

As another example, the target word determination module 114 may determine a word of which edit distance from the target word candidates ($q_1$, $q_2$, $q_n$) is equal to or less than a threshold value among the words included in the text information T by using the multi-PEX algorithm when there are two or more target word candidates to be searched (e.g., when the size of the target word candidate set Q is equal to or more than 2). First, the target word determination module 114 may segment each of all target word candidates ($q_1$, $q_2$, $q_n$) included in the target word candidate set Q into k+1 elements. Further, the target word determination module 114 may search all elements of the target word candidate set Q by applying the elements to the same Multi-string exact matching algorithm at once. As an example, when using the Aho-corasick algorithm, the target word determination module 114 may search all elements of the target word candidate set Q included in one tree. Further, when there is at least one element of the target word candidate set Q within the text information T, the target word determination module 114 may search whether there is a word of which edit distance is equal to or less than a threshold value k in a text (e.g., as long as the lengths of the target word candidates ($q_1$, $q_2$, . . . ) at both sides) section around the corresponding element. Further, when there is no element of the target word candidate set Q searched in the text information T, the target word determination module 114 may determine that "there is no word of which edit distance from the target word candidate set Q is equal to or less than the threshold value k" in the text information T.

According to an exemplary embodiment of the present disclosure, the content determination module 115 may determine a content associated with the target word. In this case, the content determination module 115 may determine a plurality of content candidates in advance, and determine a final content related to the target word among the determined plurality of content candidates. Meanwhile, the content determination module 115 may determine the content candidate by different schemes with respect to (1) "the case where the target word includes the word for the content source or the word for the content-related time" and (2) "the case where the target word does not include the word for the content source or the word for the content-related time," respectively.

As an example, the content determination module 115 may determine the plurality of content candidates based on the word for the content source or the word for the content-related time "when the target word set includes the word for the content source or the word for the content-related time." For example, when the target word set includes the word for the content source or "yesterday" and "news" which are the content-related time, the content determination module 115 may determine "yesterday news" which is news reported one day before a current date as a plurality of content candidates based on words for "yesterday" and "news." The content determination module 115 may determine a content associated with another target word of the target word set among the plurality of content candidates. As an example, the content determination module 115 may determine, as a final associated content, a content associated with "weather" which is another target word other than the word for the content source or the word for the content-related time among "yesterday," "news," and "weather" included in the target word set among a plurality of content candidates including "yesterday news."

On the other hand, "when the target word set does not include the word for the content source or the word for the content-related time," the content determination module 115 may determine the plurality of content candidates based on a content related to a user account or a user device. In this case, the content determination module 115 may determine the plurality of content candidates based on a content related to files including the target word among files stored in a cloud storage linked to a user account, call recordings, and files stored locally in a user device. For example, when the target word set includes "recording," "voice file," and "text," a plurality of content candidates including the corresponding word may be determined based on the content related to the user account or the user device. Here, the content determination module 115 may determine a content associated with at least one target word of the target word set among the plurality of content candidates. For example, when the target word set includes "recording," "voice file," and "text," the content determination module 115 may determine the content associated with at least one target word among "recording," "voice file," or "text" among the plurality of content candidates.

The content determination module 115 may determine the content associated with the target word among the plurality of content candidates. For example, when the text information includes the word for the content source or the word for content-related time, the content determination module 115 may determine, as a related content, a content including a lot of "weather" determined as the target word among "yesterday news" which is a plurality of content candidates. As another example, when the text information does not include the word for the content sources or the word for the content-related time, the file including the target word may be determined as the related content among the files stored in the cloud storage linked with the user account, the call recordings, and the files locally stored in the user device. On the other hand, the content determination module 115, when the number of contents associated with a plurality of content candidates or target words is small, the content determination module 115 may crawl a result obtained by searching the target word in a search engine, Web, YouTube, Google, etc., and determine the result as the related content.

FIG. 4 is a schematic view of a user interface related to an operation of determining the content associated with the voice signal according to an exemplary embodiment of the present disclosure.

As an example, referring to FIG. 4, the display module 116 may display a related content (e.g., call recording, a pdf file, a webpage address, etc., of "connected record" at a right side of FIG. 4) determined by the content determination module 115 jointly with a reproduction bar for reproduction of an input audio file, and editable STT result text information. When the input file is the video file, the corresponding video may also be displayed jointly.

As another example, although the display module 116 may display a recommended related content due to the operation of the input module 111 to the content determination module 115, the user may upload a related content (for example: call recording, pdf file, web page address, etc., of "connected record" at a right side of FIG. 4) to the "connected record" part through the user interface directly without the operation of the module. This is to provide convenience of the use when the user uses the STT result later.

Figure 5:
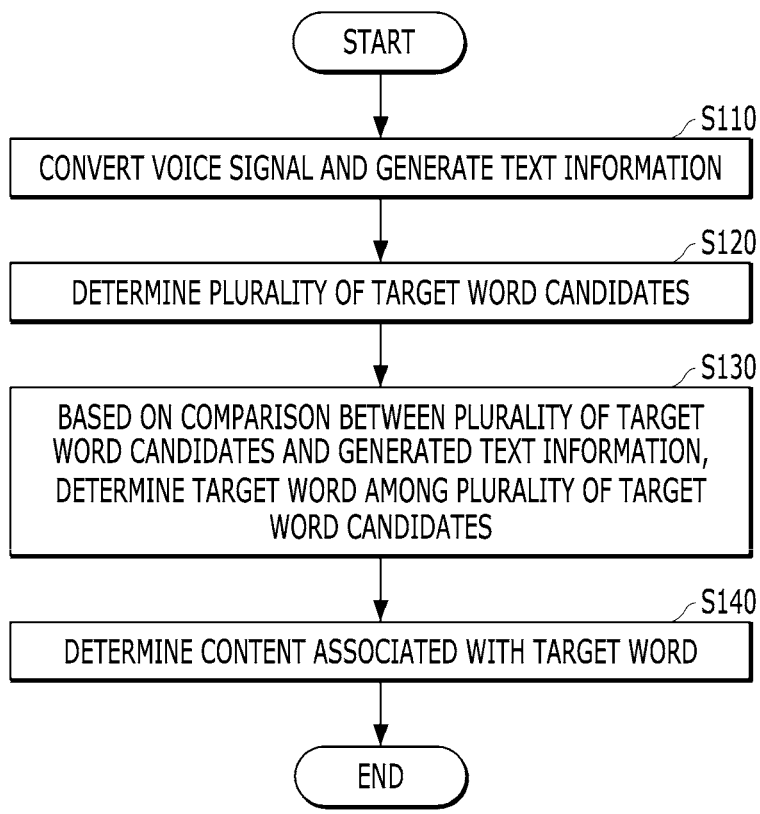
FIG. 5 is a flowchart of a method for determining a content associated with a voice signal according to an exemplary embodiment of the present disclosure.

FIG. 5 is a flowchart of a method for determining a content associated with a voice signal according to an exemplary embodiment of the present disclosure.

The method for determining a content associated with a voice signal illustrated in FIG. 5 may be performed by the computing device 100. Even if not mentioned in detail below, the above described contents of the computing device 100 may be equally applied to a description of the method for determining a content associated with a voice signal.

Referring to FIG. 5, the method for determining a content associated with a voice signal according to an exemplary embodiment of the present disclosure may include: converting a voice signal and generating text information (S110); determining a plurality of target word candidates (S120); based on a comparison between the plurality of target word candidates and the generated text information, determining a target word among the plurality of target word candidates (S130); and determining a content associated with the target word (S140). In addition, the method for determining a content associated with a voice signal according to an exemplary embodiment of the present disclosure may be performed by the computing device 100.

Step S110 above is a step of converting the voice signal and generating the text information.

Step S120 above is a step of determining the plurality of target word candidates. Step S120 may include at least one of based on user information associated with the voice signal, determining the plurality of target word candidates, or based on keyword information extracted from the generated text information, determining the plurality of target word candidates.

Step S130 above is a step of based on a comparison between the plurality of target word candidates and the generated text information, determining a target word among the plurality of target word candidates. Step S130 above may include calculating similarity with the text information for each of the plurality of target word candidates, and determining the target word among the target word candidates based on the similarity calculation result.

Step S140 above is a step of determining a content associated with the target word. Step S140 above may include determining a plurality of content candidates, and determining the content associated with the target word among the plurality of content candidates.

Meanwhile, the method for determining the content associated with the voice signal according to an exemplary embodiment of the present disclosure may include directly determining, when a word for a content source or a word for a content-related time is included in the text information, the word for the content source or the word for the content-related time as the target word regardless of whether the word being included in the plurality of target word candidates in addition to steps 110 to 140 above.

The steps mentioned in the above description may be further divided into additional steps or combined into fewer steps, depending on the implementation of the present disclosure. In addition, some steps may be omitted if necessary, and the order of steps may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 6:
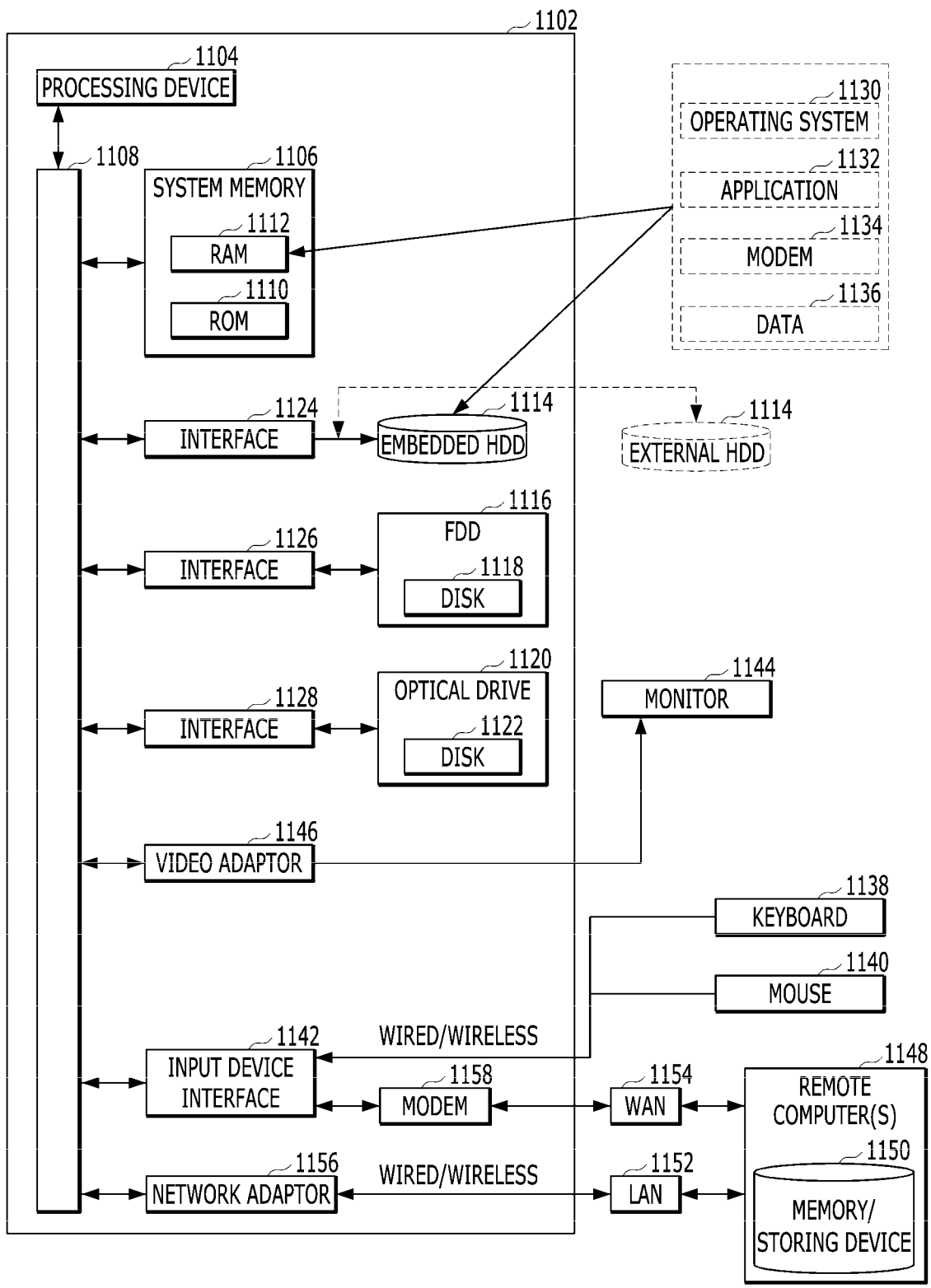
FIG. 6 is a simple and normal schematic view of an exemplary computing environment in which exemplary embodiments of the present disclosure may be implemented.

FIG. 6 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining a content associated with a voice signal performed by a computing device, the method comprising:
   converting a voice signal and generating text information,
   determining a plurality of target word candidates,
   determining a target word among the plurality of target word candidates based on a comparison between the plurality of target word candidates and the generated text information,
   directly determining a word for content source or a word for content-related time as the target word when the word for the content source or the word for the content-related time is included in the text information, regardless of whether the word being included in the plurality of target word candidates, and
   determining a content associated with the target word,
   wherein the determining of the target word among the plurality of target word candidates includes:
      assigning a similarity with the text information to each of the plurality of target word candidates, and
      determining the target word among the target word candidates based on the similarity,
   wherein the assigning of the similarity with the text information to each of the plurality of target word candidates includes:
      calculating edit distances from all words of the text information with respect to each of the plurality of target word candidates, and
      assigning a similarity to each target word candidate based on the edit distance calculated for each target word candidate.

2. The method of claim 1, wherein the determining of the plurality of target word candidates includes at least one step of
   determining the plurality of target word candidates based on user information associated with the voice signal, or
   determining the plurality of target word candidates based on keyword information extracted from the generated text information.

3. The method of claim 2, wherein the determining of the plurality of target word candidates based on the user information associated with the voice signal includes:
   determining the plurality of target word candidates based on type information of an STT model used by the user.

4. The method of claim 2, wherein the determining of the plurality of target word candidates based on the keyword information extracted from the generated text information includes:
   determining a plurality of keywords by analyzing frequencies of words in the generated text information, and
   determining the plurality of target word candidates based on the plurality of keywords.

5. The method of claim 4, wherein the determining of the plurality of keywords by analyzing frequencies of words in the generated text information includes:
   separating the generated text information into a plurality of text parts based on topic information, and
   determining a plurality of keywords by analyzing a frequency in each of the plurality of separated text parts.

6. The method of claim 1, wherein the assigning of the similarity to each target word candidate based on the edit distance calculated for each of the target word candidate includes:
   comparing a calculated edit distance for each target word candidate with a threshold value, and
   assigning a higher similarity when the calculated edit distance is less than the threshold value.

7. The method of claim 1, wherein the assigning of the similarity with the text information to each of the plurality of target word candidates includes:
   assigning a highest similarity without performing a direct calculation to a word for content source or a word for content-related time when the plurality of target word candidates includes the word for the content source or the word for the content-related time.

8. The method of claim 1, wherein the determining of the content associated with the target word includes:
   determining a plurality of content candidates, and
   determining a content associated with the target word among the plurality of content candidates.

9. The method of claim 8, wherein the determining of the plurality of content candidates includes:
   determining the plurality of content candidates based on the word for the content source or the word for the content-related time when a target word set includes the word for the content source or the word for the content-related time,
   wherein the determining of the content associated with the target word among the plurality of content candidates includes:
   determining a content associated with another target word of the target word set among the plurality of content candidates.

10. The method of claim 8, wherein the determining of the plurality of content candidates includes determining the plurality of content candidates based on a content related to a user account or a user device when a target word set does not include the word for the content source or the word for the content-related time,
    wherein the determining of the content associated with the target word among the plurality of content candidates includes:
    determining a content associated with at least one target word of the target word set among the plurality of content candidates.

11. A computer program stored in a non-transitory computer-readable storage medium, wherein when the computer program is executed by one or more processors, the computer program allows the following operations for determining a content associated with a voice signal to be performed, and the operations comprise:
    converting a voice signal and generating text information,
    determining a plurality of target word candidates,
    determining a target word among the plurality of target word candidates based on a comparison between the plurality of target word candidates and the generated text information,
    directly determining a word for content source or a word for content-related time as the target word when the word for the content source or the word for the content-related time is included in the text information, regardless of whether the word being included in the plurality of target word candidates, and
    determining a content associated with the target word,
    wherein the determining of the target word among the plurality of target word candidates includes:
       assigning a similarity with the text information to each of the plurality of target word candidates, and
       determining the target word among the target word candidates based on the similarity, wherein the assigning of the similarity with the text information to each of the plurality of target word candidates includes:
   calculating edit distances from all words of the text information with respect to each of the plurality of target word candidates, and
   assigning a similarity to each target word candidate based on the edit distance calculated for each target word candidate.

12. A computing device comprising:
at least one processor; and
a memory,
wherein the at least one processor is configured to:
   convert a voice signal and generate text information,
   determine a plurality of target word candidates,
   determine a target word among the plurality of target word candidates based on a comparison between the plurality of target word candidates and the generated text information,
directly determine a word for content source or a word for content-related time as the target word when the word for the content source or the word for the content-related time is included in the text information regardless of whether the word being included in the plurality of target word candidates, and
determine a content associated with the target word,
wherein the determining of the target word among the plurality of target word candidates includes:
   assigning a similarity with the text information to each of the plurality of target word candidates, and
   determining the target word among the target word candidates based on the similarity,
wherein the assigning of the similarity with the text information to each of the plurality of target word candidates includes:
   calculating edit distances from all words of the text information with respect to each of the plurality of target word candidates, and
   assigning a similarity to each target word candidate based on the edit distance calculated for each target word candidate.

* * * * *